May 21, 1968   L. SERRA   3,384,886
ALARM FOR EMERGENCY LIGHTING SYSTEM
Filed June 10, 1964
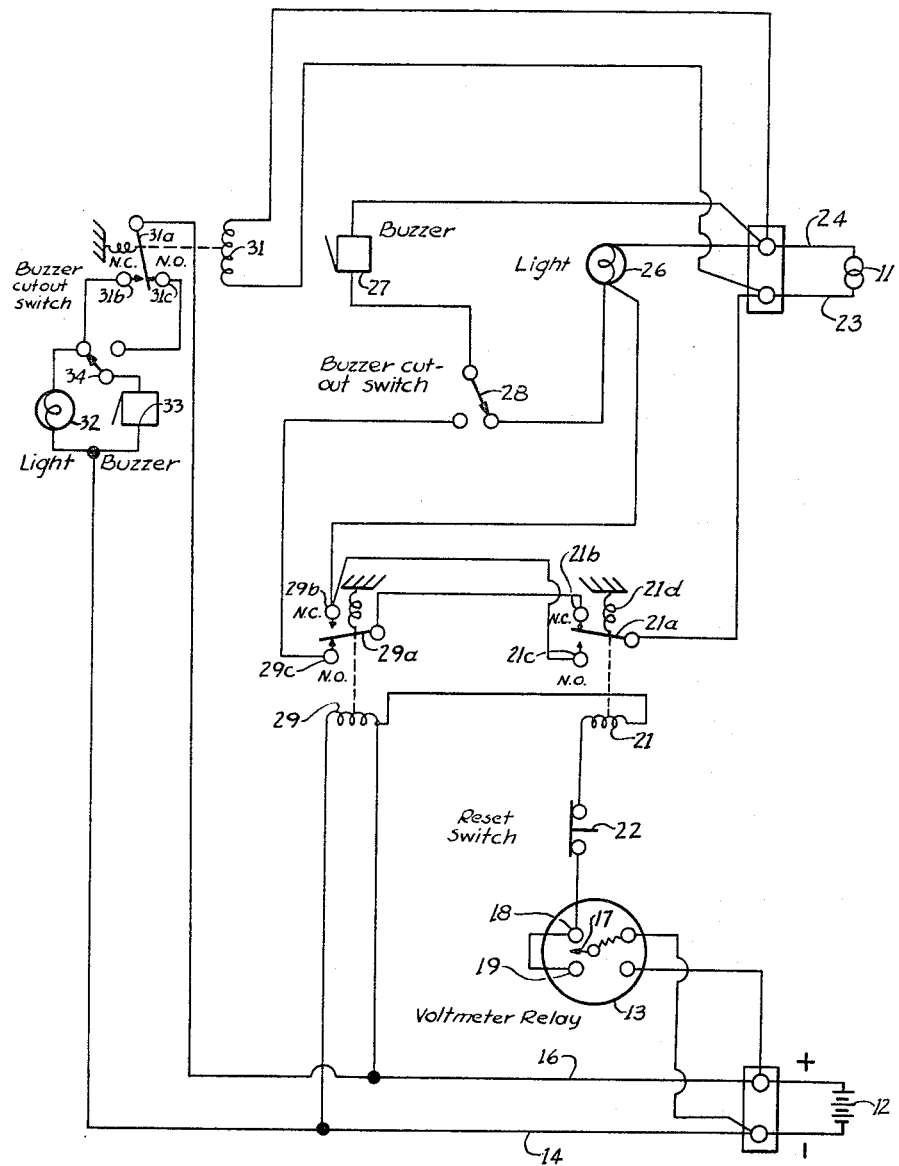
INVENTOR.
Leonildo Serra
BY
Arthur A. March United States Patent Office 3,384,886
Patented May 21, 1968

3,384,886
ALARM FOR EMERGENCY LIGHTING SYSTEM
Leonildo Serra, Newtown, Conn., assignor to Dual-Lite Company, Inc., Newtown, Conn., a corporation of Connecticut
Filed June 10, 1964, Ser. No. 373,985
2 Claims. (Cl. 340—253)

ABSTRACT OF THE DISCLOSURE

A double supervision circuit including means to warn of loss of power from the main source, a relay to monitor the availability of an emergency source, a voltage-measuring relay to indicate the voltage of the emergency source, and a relay controlled by the voltage-measuring relay and having contacts connected to contacts of the relay that monitors the availability of the emergency source and to a warning device that includes both audible and visual warning means and switch means to connect them in parallel or to connect the audible warning means so as to indicate return of the emergency source to a proper voltage level.

---

This invention relates to an alarm system to be used in conjunction with an emergency lighting system to indicate that the emergency power supply is operable and is at the proper voltage, and, at the same time, to indicate the availability of power from the main power supply.

One of the essentials for emergency lighting systems for use in places like hospitals, schools and other institutions is that the standby source of power be monitored or supervised at all times when it is in the standby condition so that the operator in charge of the system will know if anything is wrong with the standby power source prior to the time that it is called upon for use. Usually the standby power source is a battery and supervision must be maintained to be sure that the battery is kept at the proper voltage, neither too high nor too low, as well as to be sure that the lines leading from the battery have not inadvertently become disconnected or short-circuited.

At the same time it is desirable to monitor the availability of the main source of power which is usually a 60-cycle line connected to the local public utility power lines. This may be especially necessary where the system being monitored is rather large and a portion of the system some distance from the operator might go out of service without the operator being aware of it.

One of the objects of the present invention is to provide a double supervision system which will keep track of the standby power supply and the main source of power. Other objects will become apparent from the following specifications.

In accordance with this invention, an electrical circuit is provided with relays operated by the standby source of power to indicate whether the standby source of power is connected to the lines or not and whether the voltage of the standby source is at the proper level or is too high or too low. This relay system operates one or more alarms connected to the main power source to give an audible or visual indication, or both types of indications, if anything goes wrong with the standby source of power. The system also includes relay means operated from the main power source to control a second alarm system operated by power from the standby source to indicate by means of audible or visual signals, or both, whether or not the power from the main source is being properly received.

The invention will be described in greater detail in connection with the drawing in which the only figure is a schematic diagram of the electrical circuit of the invention.

In the diagram, a main power supply 11 which may be, for example a 115-volt 60-cycle AC generator, and a standby source 12, which may be a battery located physically close to the emergency lighting system to be operated from the battery, are to be supervised. The supervisory circuit for the battery includes a volt meter relay 13 connected to the supply lines 14 and 16 leading to the battery 12. This volt meter relay operates as a measuring device to measure the voltage between the two lines 14 and 16 and it is provided with a relay armature 17 and two terminals 18 and 19 short-circuited together. One of the terminals 18 is contacted by the armature 17 when the voltage between the lines 14 and 16 is too high, while the other terminal 19 is contacted by the armature when the voltage is too low. Since, in either case it is necessary for the operator to know that something is wrong with the voltage of the battery 12, it is unnecessary to indicate whether the voltage is too high or too low, but merely that it is not at the proper level which would keep the armature 17 in space between the terminals 18 and 19. By connecting these two terminals directly together, a single indicator to be described hereinafter will indicate that something is wrong and that the battery, or its charger circuit (not shown), must be checked.

The coil of a relay 21 is connected in series with a reset switch 22 between the short-circuited terminals 18 and 19 and the line 16. Since the armature 17 is connected to the other line 14, the relay 21 will be energized whenever the volt meter relay 13 indicates either a high voltage or a low voltage between the lines 14 and 16, because in either instance current will flow through the armature 17 to the appropriate one of the terminals 18 or 19 and through the reset switch 22 and the coil of the relay 21 to energize the latter relay. The purpose of the reset switch, as its name indicates, is to reset the system once proper operation of the standby power source 12 has been reestablished.

The relay 21 has an armature 21a moving between a normally closed terminal 21b and a normally open terminal 21c. The relay has a spring 21d that attracts the armature 21a to the normally closed terminal 21b, unless the magnetomotive force indicated by the broken line joining the coil of the relay 21 to the armature 21a attracts the armature 21a to the normally open terminal 21c. The armature 21a is connected to one of the supply lines 23 of the two supply lines 23 and 24, joining the system to the main power source 11. The normally open terminal 21c is connected to a warning device including, in this embodiment, a light 26 connected in parallel with a buzzer 27. Both the light and the buzzer are connected to the other power line 24 so that when the armature 21a is pulled over to the normally open terminal 21c the light 26 will light up and the buzzer 27 will sound. The buzzer cutout switch 28 is included in series with the buzzer to permit the audible system to be disconnected by the operator while the fault in the standby power supply is being located.

To guard against the possibility that the standby power supply battery 12 might be entirely disconnected or might be short-circuited and therefore be unable to supply the necessary power to operate the relay 21, the coil of a second relay 29 is connected across the lines 14 and 16. The armature 29a of this relay operates between a normally closed terminal 29b and a normally open terminal 29c and is drawn to the latter as long as the standby power supply is capable of supplying any substantial amount of power at all. Under usual conditions the relay 29 would simplye be energized when the system was first put into operation and would continue to be energized at all times thereafter as long as the standby power supply was available. The indication that may be obtained from the relay 29 is of a more gross nature than the indication that may be obtained from the relay 21, but because of the fact that it is possible to arrive at a condition under which the relay 21 will not be able to operate at all, i.e., when the standby power supply 12 is completely disconnected or short-circuited, it is necessary to have this gross indicator.

If the standby supply 12 is capable of furnishing the miniscule amount of power necessary to operate the relay 29, the armature 29a will be drawn against the normally open terminal 29c and no current will pass through this armature. However, if the standby power supply 12 is either short-circuited or disconnected so that the armature 21a remains against its normally closed terminal 21b, the power required to hold the armature 29a against the normally open terminal 29c will no longer be available. Thereupon, the armature 29a will fall against the normally closed terminal 29b, permitting current to be drawn from the main power source 11 through line 23, the armature 21a, the normally closed terminal 21b, the armature 29a, the normally closed terminal 29b, and the warning system comprising the parallel connected light 26 and buzzer 27 to the line 24. Thus, it may be seen that the light 26 will light and the buzzer 27 will buzz when the voltage of the standby power supply battery 12 goes to zero, as well as when it merely drifts to a slightly higher or slightly lower voltage than it is expected to have. As before, the buzzer cutout switch 28 may be actuated to disconnect the buzzer 27, while the necessary repairs are made to the standby power supply 12. It should be noted that once the power supply 12 is back in proper operating condition so that the armatures 21a and 29a return to the positions shown in the drawing, the buzzer 27 will again buzz if the switch 28 has been operated to place the buzzer in contact with the normally open terminal 29c. This will warn the operator that the system is in proper operating condition and that the buzzer cutout switch 28 must be thrown back to the position indicated in the drawings so that both the buzzer 27 and the light 26 will be connected in parallel for warning the operator the next time anything goes wrong with the standby power supply 12.

In order to indicate to the operator that the main power source 11 has become inoperative or has been disconnected, the coil of a third relay 31 is connected across the power lines 23 and 24. The armature 31a of this relay is connected to the line 16 of the emergency power supply 12 and is held against a normally open terminal 31c as long as power is supplied from the source 11. If there is an interruption in this supply of power, the armature 31a falls into contact with a normally closed terminal 31b which is connected in series with a warning circuit comprising a second light 32 connected in parallel with a second buzzer 33 and in series with the supply line 14 from the standby power supply. Thus, loss of power from the source 11 will permit current to flow from the standby power supply 12 through the line 16, the armature 31a, the normally closed terminal 31b, and both the light 32 and the buzzer 33 to the supply line 14 and thence back to the supply 12. A single-pole-double-throw buzzer cutout switch 34 is connected in series to the buzzer 33 to permit this buzzer to be disconnected from the normally closed terminal 31b while repairs are being made to the main source 11. When disconnected from the normally closed terminal 31b, the buzzer 33 is connected by way of the switch 34 to the normally open terminal 31c. As a result, the buzzer is again energized when the power from the source 11 is restored and the relay 31 is energized to draw the armature 31a back into contact with the normally open terminal 31c. Thereupon the operator will throw the switch 34 back to the position shown in the drawing so that the buzzer 33 will again be ready to indicate loss of power from the source 11.

While this invention has been described in terms of a specific embodiment, it will be recognized by those skilled in the art that modifications may be made therein as shown in the following drawing.

What is claimed is:

1. An alarm system comprising first connection means to connect said system to an emergency source of electric power; second connection means to connect said system to a main source of power; a first relay connected to said second connection means to be energized by power from said main source and comprising first and second fixed terminals and an armature movable into contact with said first terminal when said relay is not energized and into contact with said second fixed terminal when said relay is energized; first warning means comprising a first audible warning device and a first visual warning device connected in parallel with each other and in series with said first connection means; a first switch having a movable arm connected in series with said audible warning device and a first fixed contact connected to said first fixed contact of said relay and a second fixed contact connected to said second fixed contact of said relay; voltage-measuring relay means connected to said first connection means to measure the output voltage of said emergency source and comprising a movable armature and first and second fixed terminals to be engaged alternately by said movable armature when the voltage of said emergency source is higher or lower, respectively, than a pre-determined value, said first and second terminals being short-circuited together; a second relay connected in series with said fixed terminals of said voltage-measuring relay and with said first connection means to be energized when the voltage of said emergency source differs from said predetermined value, said second relay comprising an armature, a first fixed contact to be engaged by said armature when said second relay is energized and a second fixed terminal to be engaged by said armature when said second relay is not energized; a third relay connected to said first connection means to be energized by said emergency source and comprising an armature connected to said second fixed terminal of said second relay, a first fixed terminal connected to said first fixed terminal of said second relay, and a second fixed terminal; and a second warning means comprising a second audible device and a second visual device connected in parallel with each other and in series with said second connection means and with said first fixed terminal of said third relay, said second warning means comprising a second switch having an armature connected in series with said second audible warning device, a first fixed terminal connected to said second visual warning device, and a second fixed terminal connected to said second fixed terminal of said third relay whereby when said movable arm of said second switch is in contact with said second switch, said second audible warning device will be energized from said main source when said third relay is re-energized from said emergency source and the voltage of said emergency source has said predetermined value.

2. An alarm system comprising: first connection means to connect said system to an emergency source of electrical power; second connection means to connect said system to a main source of power; first warning means electrically connected to said second connection means to indicate an interruption of power from said main source, said warning means also being electrically connected to said first connection means to be energized thereby when there is an interruption of power from said main source; voltage-measuring relay means connected to said first connection means to measure output voltage of said emergency source and comprising fixed contact means and an armature engaging said fixed contact means when the voltage of said emergency source differs from a predetermined value; a first relay connected in circuit with said first connection means and the armature and fixed contact of said voltage-measuring relay to be energized by said emergency source when the voltage thereof differs from said predetermined value, said first relay having a normally-closed contact and a normally-open contact and an armature movable into connection with said normally-closed and said normally-open contacts alternately; a second relay connected to said first connection means to be energized from said emergency source and having a normally-closed contact and a normally-open contact and an armature movable alternately into connection with the normally-closed and normally-open contacts of said second relay; a connection from the normally-closed contact of said first relay to the armature of said second relay; a connection from the normally-open contact of said first relay to the normally-closed contact of said second relay; and second warning means comprising an audible warning device, a visual warning device, and a switch having a movable arm connected to said audible warning device and a first fixed contact connected to said visual warning device, whereby said audible and visual warning devices can be connected in parallel, said visual warning device being connected in series with the normally-closed contact and armature of said second relay and the normally-closed contact and armature of said first relay and said second connection means to be energized by the main source of power when the voltage of said emergency source differs from said predetermined value, said switch having a second fixed terminal connected to the normally-open contact of said second relay, whereby said audible warning device may be disconnected from parallel connection with said visual warning device and may be connected instead to the normally-open contact of said second relay to be energized by said main source when the voltage of said emergency source returns to said predetermined value.

References Cited

UNITED STATES PATENTS

| | | | |
|---|---|---|---|
| 3,013,257 | 12/1961 | Ippolito | 340—249 |
| 663,059 | 12/1900 | Zvorikin et al. | 340—333 |
| 1,710,542 | 4/1929 | Landis | 340—333 X |

FOREIGN PATENTS 359,050  10/1931  Great Britain.

JOHN W. CALDWELL, *Primary Examiner.*

NEIL C. READ, D. K. MYER, *Examiners.*